United States Patent
Aksyuk et al.

(10) Patent No.: US 6,173,105 B1
(45) Date of Patent: Jan. 9, 2001

(54) OPTICAL ATTENUATOR

(75) Inventors: Vladimir A. Aksyuk, Middlesex; Bradley P. Barber, Chatham; David J. Bishop, Summit; Clinton R. Giles, Whippany; Lawrence W. Stulz, Shark River Hills; Rene R. Ruel, Bridgewater, all of NJ (US)

(73) Assignee: Lucent Technologies, Murray Hill, NJ (US)

( * ) Notice: Under 35 U.S.C. 154(b), the term of this patent shall be extended for 0 days.

(21) Appl. No.: 09/197,957

(22) Filed: Nov. 20, 1998

(51) Int. Cl.[7] .................................................. G02B 6/00
(52) U.S. Cl. ........................... 385/140; 383/14; 383/15; 383/19; 383/25; 383/129
(58) Field of Search .................... 385/14, 15, 19, 385/38, 39, 25, 140, 129, 130

(56) References Cited

U.S. PATENT DOCUMENTS

| | | | |
|---|---|---|---|
| 4,556,280 | * 12/1985 | Bagby | 385/19 X |
| 4,674,831 | * 6/1987 | Bagby | 385/19 X |
| 4,836,636 | * 6/1989 | Obara et al. | 385/19 X |
| 4,844,577 | * 7/1989 | Ninnis et al. | 385/19 X |
| 5,016,978 | * 5/1991 | Fargette et al. | 385/19 X |
| 5,052,777 | * 10/1991 | Ninnis et al. | 385/19 |
| 5,226,099 | * 7/1993 | Mignardi et al. | 385/19 |
| 5,745,634 | * 4/1998 | Garrett et al. | 385/140 |
| 5,923,798 | * 7/1999 | Aksyuk et al. | 385/19 |

* cited by examiner

Primary Examiner—Brian Healy

(57) ABSTRACT

An optical attenuator for use in optical power regulation uses a shutter to control the insertion loss of a gap in a pair of substantially coaxially aligned waveguides, for example a pair of optical fibers. The shutter is part of a MEMS accuator device and is coupled to the movable one of a pair of spaced plates, the movable plate being movable by a voltage applied between the pair of plates. To regulate the power, a small portion of the optical power is abstracted and used to derive a control voltage that is applied to the optical attenuator for varying the attenuation inserted in the optical wave path.

12 Claims, 2 Drawing Sheets

OPTICAL ATTENUATOR

FIELD OF THE INVENTION

This invention relates to an optical attenuator and more particularly to an optical attenuator that uses a micro-electro-mechanical system (MEMS) device for control of the attenuation.

BACKGROUND OF THE INVENTION

Optical components in optical communication networks need to operate over a wide range of power levels, varying from those emanating from high power sources and amplifiers that may be tens of watts to signals of fractions of microwatts arriving at receivers for detection. Moreover, there is often the need in such networks for a wide dynamic range of optical power sources and receivers. For example, in wavelength division multiplexed (WDM) systems, the power needs are dependent on the number of channels present at a particular time in a WDM system. Also fixed optical attenuators are frequently used to add attenuation to short optical fiber spans to reduce the power impinging on the receiver's detector and variable attenuators have been proposed for use in WDM networks to regulate the signal power to a level appropriate to the number of channels then active.

It is important for a variable optical attenuator to add little excess insertion loss when the signal power is already as low as desirable.

It is also important for a variable optical attenuator to be able to respond rapidly to sudden increases in power levels since excessive power levels that are allowed to persist too long often can do considerable damage or otherwise impair operation.

The present invention provides a variable optical attenuator that should be able to meet these various requirements. In particular, the invention provides a variable power attenuator that is especially useful for power regulation.

The invention involves the use of a novel micro-electro-mechanical system (MEMS) device to provide control of the attenuation. MEMS technology is now a well-recognized technology. Basically, it involves forming a multilayer structure by sequentially depositing and shaping on a silicon substrate a plurality of polysilicon layers that are separated by layers of silicon oxide and/or silicon nitride. The shaping of the layers is generally done by the techniques used in the manufacture of silicon integrated circuits and generally involves the patterning of the layers by photolithographic techniques. The basic principles of MEMS technology are described in a paper entitled "MEM'S the Word for Optical Beam Manipulation" that was published in *Circuits and Devices*, July 1997, pp. 11–18. MEMS devices are available from many sources, such as, for example, the MEMS Technology Application Center at North Carolina (MCNC) that custom makes devices on order.

Various applications of MEMs devices are described in copending application Ser. No. 09/088,182, filed Jun. 1, 1998 by five of the present applicants and having a common assignee.

SUMMARY OF THE INVENTION

A variable optical attenuator in accordance with the invention comprises first and second optical waveguides, for example optical fibers that are positioned end to end, preferably slightly offset from coaxial alignment, and spaced apart to define a small gap between adjacent ends of the two optical fibers. These adjacent ends are preferably angle cleaved and coated to be anti-reflective so that an optical signal introduced at the far end of the first or source fiber will pass through the gap and continue along the second fiber with little loss of power, the offset in alignment of cleaved end surfaces of the fiber sections largely compensating for the bending of the optical signal as it exits and enters the cleaved surfaces. To vary the insertion loss introduced by the gap between fiber sections, a MEMS device that includes a movable shutter element is positioned so that the shutter may be interposed in controlled amounts into the gap quickly and easily to vary the amount of optical signal that traverses the gap. Advantageously, typically the shutter surface on which optical signal power to be controlled is incident is coated to be highly opaque or reflective of such incident signal, preferably scattering such signal so that little of it either traverses the gap to enter into the second fiber or is reflected back into the first fiber.

Alternatively, if it is desired to utilize such reflected energy, it may be captured by the source fiber and later diverted to a different wave path in any of the known ways to separate out this backward traveling light.

For use in optical power regulation, the variable attenuator described is positioned at the output of the power source or amplifier being regulated and a known fraction of the power level at the output of the attenuator is abstracted and detected. The resulting detected signal level is compared with a known reference level that corresponds to the desired power at the output of the attenuator were at the level desired. The two signals are compared and any difference signal is used to control the attenuation provided by the attenuator.

The invention will be better understood from the following more detailed description.

Figure 1:
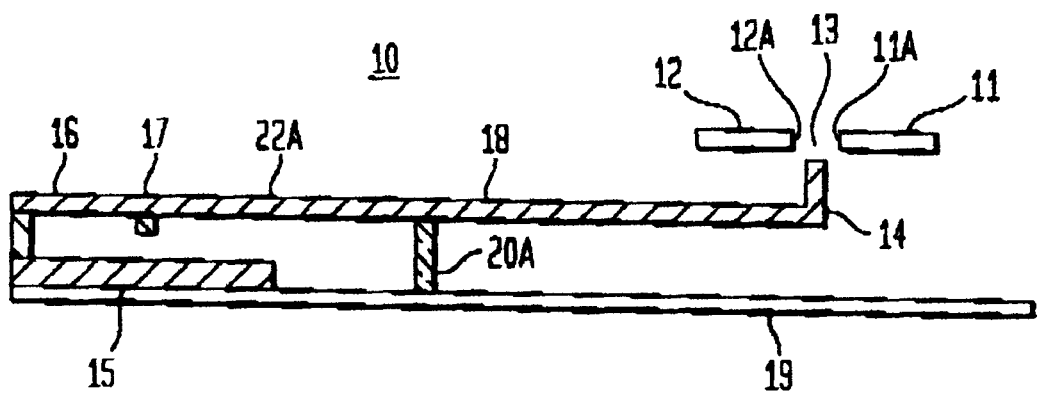
FIG. 1 shows a side view of the basic elements of one configuration of art optical attenuator using a MEMS device illustrative of the invention.

It is to be noted that the drawing is not to scale.

DETAILED DESCRIPTION

Figure 4:
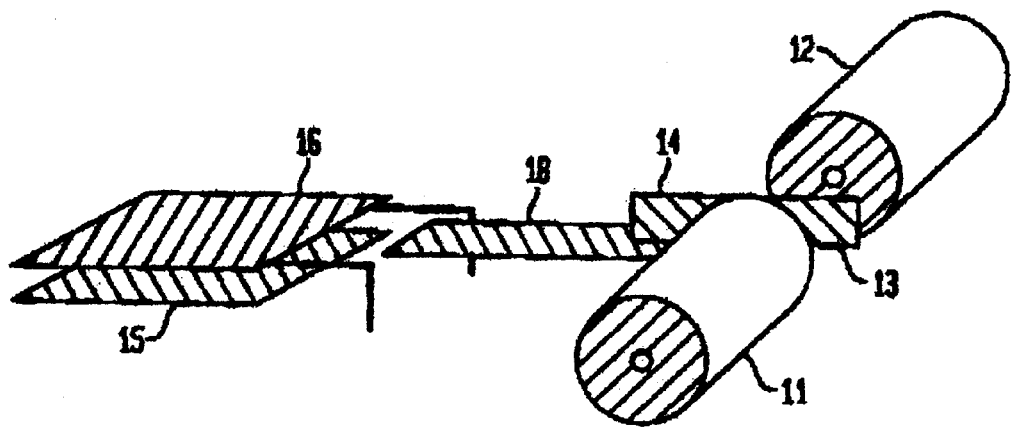
FIG. 4 shows the position of the shutter in the gap in its rest position in another configuration of the embodiment.

With reference now to the drawing, FIG. 1 shows schematically one configuration of the basic structure of a variable attenuator that uses an element of a MEMS device for control of the attenuation provided to an input optical signal. It includes a pair of waveguides, advantageously optical fibers 11 and 12, aligned end-to-end. As shown, the two fibers 11 and 12 are slightly offset from coaxial alignment and the adjacent fiber ends 11A and 12A are spaced apart to define a gap 13 therebetween. In a different configuration, presently preferred, shown in FIG. 4, the fibers are oriented to come in and out of the plane of the drawing of FIG. 1. The two adjacent ends are each angle cleaved, and the offset is used to compensate for the bending in light traveling from the first (source) fiber 11 to the second (output) fiber 12, so that the light may continue with low insertion loss. The angle cleaving serves to minimize entry into the source fiber of any light reflected by the output fiber at the cleaved surface. It also serves to minimize any reflection back into the source fiber of light exiting from the source fiber. Of course, if desired, there may be omitted either or both the angle cleavage and the alignment offset.

To introduce variable attenuation, a MEMS device 10 is provided with a shutter 14 that can be inserted a controlled amount into the gap 13 for scattering or absorbing the radiation passing out of the source fiber that is incident on such shutter. Since the signal power is largely concentrated in the core, for maximum effect the shutter advantageously is inserted in a manner the better to intercept the light passing out of the core of the source fiber. Additionally, since it is typically undesirable that any of the light incident on the shutter be reflected back into the core region of the core fiber for travel backwards therein, in such instance it is advantageous to insert the shutter at such an angle into the gap that little reflected light is redirected back into the core section of the source fiber. However, in instances where it is desired to recover the reflected light for utilization, the measures to eliminate re-entry of the reflected light should be avoided.

A typical high performance optical fiber comprises a core of relatively small diameter, typically between six and eight microns, and a surrounding cladding typically of about 125 microns diameter. The shutter 14 aligned with the gap typically may have a height of about fifty microns and, when in its rest position, does not block the critical region of the gap between the two fibers. As previously mentioned, in FIG. 4, there is shown more clearly a different relationship between the shutter 14 and the fiber ends in the rest position. In an optical fiber, most of the energy of an optical signal is concentrated in the fiber core and the closely surrounding portion of the cladding. In particular, in a fiber having a core diameter of about eight microns and a cladding diameter of 125 microns, essentially all of the energy of an optical signal traveling in such a fiber is included in a central region of the fiber having a diameter of less than twenty microns. The position of the shutter 14 is controlled by an actuator that includes a pair of spaced plates 15, 16, of which lower plate 15 is fixed and upper plate 16 is a thin layer movable under control of a voltage applied between the two plates. The lower plate rests on substrate 19, typically of silicon, with an intervening layer of silicon nitride (not shown). To permit such movement the left end of the upper plate is fixed and the right end connected to a lever arm 18. With zero voltage applied to the actuator, the shutter does not affect the critical gap region. When the shutter is activated by applying sufficient voltage to the actuator, it is moved to interrupt this critical region.

Figure 2:
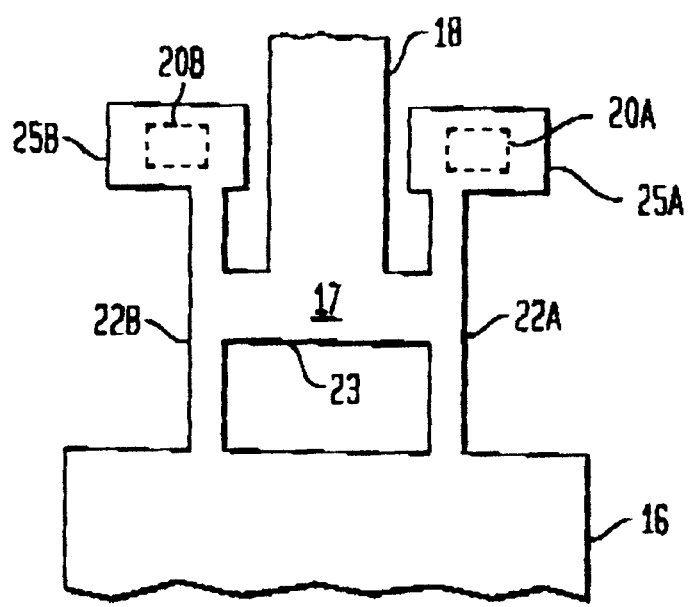
FIG. 2 is a top view showing details of the MEMS device used to vary the attenuation in the attenuator shown in FIG. 1.

The shutter 14 is positioned at the free end of the lever arm 18. Lever arm 18 is an extension of the top plate 16 of the voltage-controlled actuator formed by the two spaced polysilicon plates 15, 16. The downward movement of the plate 16 is made to cause upward movement of the shutter 14 that is pivoted about a pair of support posts 20A, 20B, of which one is seen in side view in FIG. 2. To provide flexibility to the lever arm 18 and facilitate its upward motion, there is provided a flexure section 17 between the lever arm 18 and the top plate 16, as seen in the top view of FIG. 2. This flexure section 17 comprises a pair of thin flexible arm 22A, 22B, that extend between the plate 16 and the support posts 20A, 20B, respectively. At the ends where the arms 22A, 22B are supported, each includes an enlarged end portion 25A, 25B. Additionally, a brace section 23 extends between the two arm sections 22A, 22B from which extends the lever arm 18. Advantageously, the shutter 14 was rotated 90 degrees to its operating vertical position upon release by a self-assembly mechanism to perform the rotation automatically upon release. The self-assembly mechanism uses energy stored in a high tensile residual stress metal layer to produce vertical motion, which is then used to rotate and lock the shutter in position as is discussed in a paper entitled, "Low Insertion Loss Packaged and Fiber Connectorized Si Surface-Micromachined Reflective Optical Switch" that appeared in the Proceedings of Solid State Sensors and Actuators Workshop at Hilton Head Island, S.C. on Jun. 8, 1998 by applicants of this application and its teaching is incorporated herein by reference. This paper describes earlier embodiments of the MEMS device and the present application describes a later generation of the MEMS device that is viewed as an improvement. By appropriate design, the lever arm is made to lift the shutter 14 into the gap between the fiber ends by the application of a suitable voltage between the two plates 15, 16 that form the actuator. The displacement of the shutter 14 needs to be sufficient to enter the critical region, as has been discussed. It can be appreciated that the movement of the shutter is essentially frictionless because it involves essentially no rubbing between moving parts.

To prevent the top plate 16 from touching the bottom plate 15 and shorting the capacitor formed by the two plates, spacers (not shown) can be provided protruding from the bottom surface of the top plate 16 and holes (not seen) can also be provided in the bottom plate 15 aligned with the posts such that the posts can pass through the holes to rest on the nitride-covered silicon substrate 119 underlying the bottom plate 15 without touching the plate if the applied voltage is sufficient. Typically the mass of the shutter assembly comprising the top plate 16, the flexure section 17, the lever 18 is sufficiently light and the material is sufficiently rigid that the posts 20A and 20B can keep it suspended appropriately in the absence of any applied voltage.

The extension arm 18 typically may be about 500 microns long and capable of rotation around the pivot point to provide a desired mechanical advantage. As discussed, the pivot point is provided by the support posts 20A and 20B and the lever arm is coupled to the top plate of the actuator by the two flexible arms 22A, 22B. Their size is chosen to permit an adequate lever rotation angle for a specified separation change between the two plates, without requiring an excessively high voltage to move the top plate sufficiently to provide the necessary lever arm rotation angle. Typical dimensions are for each plate to be about 200 $\mu$m on a side with plate 15 about 0.5 $\mu$m thick and plate 16 about between 1.5 and 3.0 $\mu$m thick with a spacing between plates of about 2 $\mu$m. The length of the lever is between 18 to 30 $\mu$m long, its width between 1.5 and 3.0 $\mu$m, and its thickness between about 1.5 and 2.0 $\mu$m, the shutter is, about 50 $\mu$m square and the width of the gap 13 between the two waveguides 11, 12 is about 20 $\mu$m. Of course, these dimensions can be varied, although they should all be in the micrometer range.

Instead of DC, the control voltage preferably should be an alternating voltage of a frequency sufficiently high, for example 100 kilocycles per second, to be higher than the mechanical resonant frequency of the MEMS device. This is to avoid the known charging effect on the actuation that might occur with d-c actuation. Because of the electrostatic nature of the control operation, very little amount of electric power is needed for control.

Figure 3:
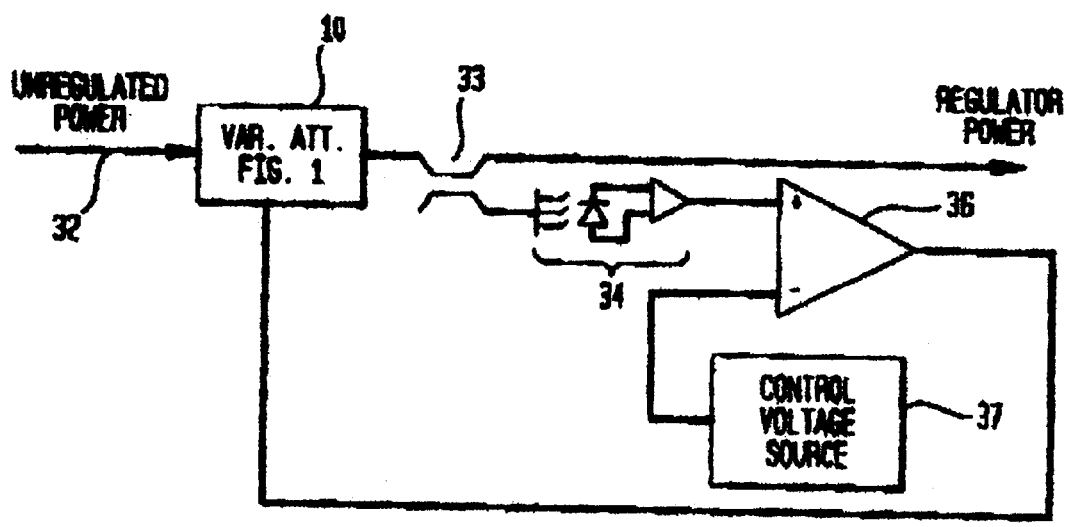
FIG. 3 shows schematically an optical power regulator that uses for regulation a variable attenuator in accordance with the invention.

As seen in FIG. 3, for power regulation, there is inserted in the waveguide 32 transmitting the optical signal to be regulated a variable attenuator 10 of the kind previously described that includes a MEMS device for control of signal power that passes through the attenuator. A known, typically small, fraction of the optical signal at the output of the attenuator is abstracted by way of a coupler 33 of any suitable form and this optical signal is detected and amplified to a suitable voltage in a conventional optical detector-amplifier 34. This detected voltage forms an input to the differential amplifier 36. The other input voltage to the amplifier 36 is provided by the reference voltage source 37. This reference source provides a voltage that would match the voltage provided by the detector-amplifier 34 if the signal power abstracted were at the desired level. Accordingly, any difference in the amplified voltage level detected and the reference voltage acts as an error signal that will be amplified by the amplifier 37 and available for control of the attenuator 10. If desired, smaller amounts of the signal power may be abstracted, and after detection amplified for use in deriving the control, with a resultant saving in the signal power being abstracted. As was discussed, the voltage applied for control is best provided as an alternating voltage.

It should be apparent that the arrangement described can be modified by abstract control power upstream of the variable attenuator rather than downstream of it. Also one can readily devise circuit alternatives, other than use of a differential amplifier, to control the attenuation with a sample of its input power.

It should also be apparent that various other arrangements available for control can be used. In particular, when warranted, a more sophisticated circuit to provide the desired feedback transfer function can be employed, such as one that also controls the rate of change, for example PID control, in place of the differential amplifier arrangement shown.

It should be apparent that because of the small size of the devices involved and the fabrication techniques employed, which are very similar to those employed in the manufacture of monolithic integrated circuits, the invention can be used with fiber ribbons and silica or silicon waveguides to form monolithic arrangements that include a large number of such devices.

It should be understood that the specific embodiment described is merely illustrative of the general principles of the invention. Various modifications may be devised by a worker in the art without departing from the spirit and scope of the invention. For example, the optical waveguides involved can be of the known planar type using a planar surface on which are formed waveguides that depend on index of refraction differences. In particular, the variable optical attenuator should be useful in a variety of other ways in optical networks. The attenuator can be used to control the power level of individual channels either into or out of add/drop multiplexers or cross-connect optical networks.

What is claimed:

1. An optical attenuator comprising:
   first and second optical waveguides, positioned in end to end relationship with a gap between adjacent ends of the two waveguides; and
   a MEMS device including a shutter that is controllable by an applied voltage and positioned adjacent the gap whereby the shutter may be controllably introduced within the gap to intercept incident light thereby to introduce a desired attenuation to the passage of an optical signal from the first waveguide to the second waveguide.

2. An optical attenuator in accordance with claim 1 in which the two waveguides are optical fibers and their ends adjacent the gap are angle cleaved, anti-reflection coated and slightly offset from coaxial alignment to compensate for the bending of light exiting from the source fiber at the cleaved ends.

3. An optical attenuator in accordance with claim 1 in which the MEMS device includes a pair of conductive plates spaced apart of which one is movable by the application of a voltage between the two plates and the shutter is flexibly coupled to the movable plate whereby the movable plate provides movement to the shutter and the shutter is introduced within the gap an amount under control of the applied voltage.

4. An optical attenuator in accordance with claim 3 in which the movable plate is coupled to the shutter element by way of a flexible section that comprises a braced pair of arms.

5. An optical attenuator in accordance with claim 1 in which the waveguides are planar waveguides.

6. An optical attenuator in accordance with claim 1 in which the waveguides are silica-on-silicon optical waveguides.

7. An optical attenuator in accordance with claim 3 in which the waveguides are silica-on-silicon optical waveguides.

8. An optical power regulation arrangement for regulating the optical signal level available at a given location of an optical wave path comprising:
   a coupling element for abstracting a known fraction of the power level of optical signal available at the coupling region;
   optoelectrical means supplied with said abstracted optical power for deriving a signal voltage that is a measure of the optical power that would have been abstracted if the optical signal was at a desired power level at the point of abstraction and providing a control voltage; and
   a variable optical attenuator that is positioned along the wave path of the optical signal and is supplied with the control voltage for controlling the insertion loss of the attenuator, said attenuator comprising a MEMS device supplied with the control voltage for controllably inserting a shutter in the wave path for introducing loss in the wave path.

9. An optical power regulation arrangement in accordance with claim 8 in which the MEMs device includes a pair of actuator plates between which is applied the control voltage for control of the insertion loss of the attenuator of which one of the plates is moved by the control voltage and such movement controls the position of a shutter in a gap between a pair of waveguides that define the wave path of the optical signal whose power level is to be regulated through the variable attenuation.

10. An optical power regulation arrangement for regulating the optical power level at the given location of an optical wave path in accordance with claim 8 that includes means for comparing the signal voltage with a reference voltage for deriving the control voltage.

11. An optical power regulation arrangement in accordance with claim 10 in which the comparing means is a differential amplifier supplied with the reference voltage and the derived signal voltage.

12. An optical power regulation arrangement in accordance with claim 8 in which the optical attenuator is positioned downstream of the attenuator in the wave path.

* * * * *